3,448,609
APPARATUS FOR ACCURATELY MEASURING THE SPECIFIC FUEL CONSUMPTION OF INTERNAL COMBUSTION ENGINES

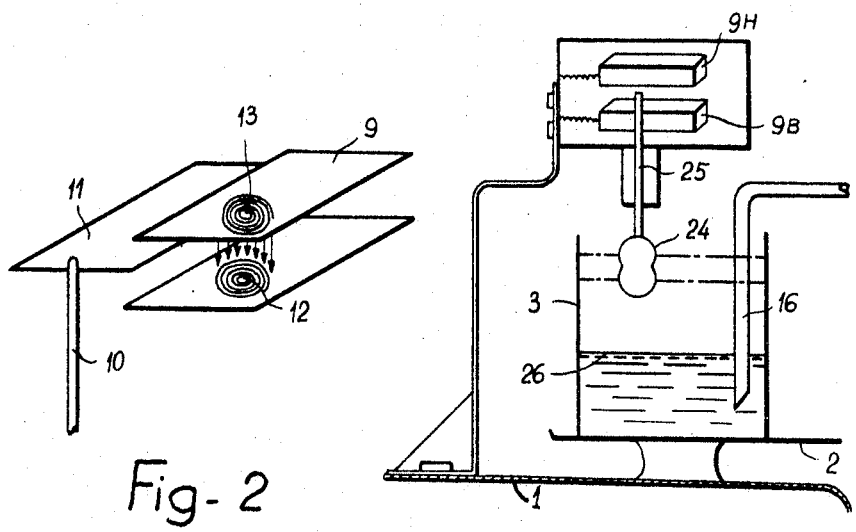
Fig-2
Fig-3
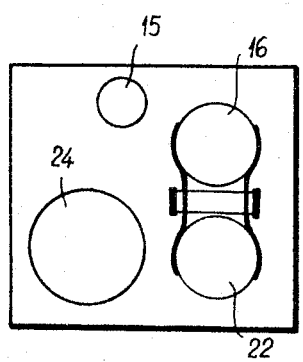
Fig-4
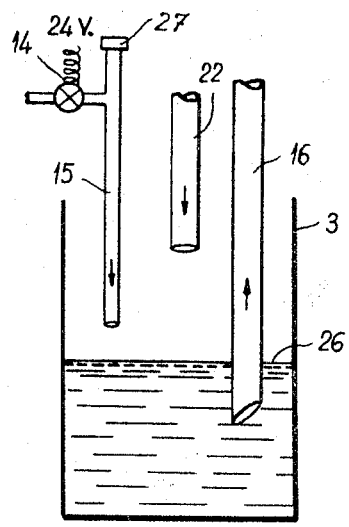
Fig-5

Jean-Paul Sibeud, Lyon, France, assignor to Automobiles M. Berliet, Lyon, Rhone, France
Filed Nov. 29, 1967, Ser. No. 686,473
Claims priority, application France, Dec. 14, 1966, 87,342
Int. Cl. G01m 15/00; G01l 3/26
U.S. Cl. 73—113           9 Claims

ABSTRACT OF THE DISCLOSURE

Apparatus for the precision measurement of the specific fuel consumption of an internal combustion engine, wherein the fuel consumed by the engine during a time period is weighed by means of an automatic balance carrying on its pan the vessel containing said fuel and feeding a centrifugal pump connected to the injection system of the engine, the balance pointer, during its movement, causing electromagnetic pick-up means to emit signals controlling the filling of said vessel and the counting of the revolutions per minute of the engine and the time required for consuming a predetermined quantity of fuel, and wherein a device supplying fuel to the engine holds the balance stationary during the pause between successive measurements.

---

The present invention is concerned with apparatus for measuring the specific fuel consumption of internal combustion engines, notably diesel or compression-ignition engines.

In known methods of measuring the specific fuel consumption of internal combustion engines a Roberval balance and the double-weighing method are used. These methods are objectionable on the one hand on account of the necessity of handling a tare, thus causing shocks likely to interfere with the measurement, and on the other hand, because the beginning and the end of the measurement are given by the passage of the balance beam to its position of equilibrium and may easily be disturbed by an uneven output, due notably to the use of a piston pump in the injection system, by an external excitation caused by vibration, shocks, and also by electric control contacts, not to mention air flows or movements. Moreover, the balance constantly operates on its knife-edges, so that a rapid wear is likely to be expected. The precision of hitherto known devices is only of the order of 1% and truly accurate measurements are therefore not possible with these prior methods.

It is the object of the present invention to provide an apparatus utilizing the dynamic operation of a balance having a great kinetic energy in relation to that of the disturbances set forth hereinabove, which avoids the inconveniences of the above-mentioned known arrangements while affording high-precision measurements.

The device according to this invention is characterised in that it consists of an automatic balance adapted to weigh the fuel consumed during the measurement period and contained in a measuring vessel supported by the pan of the balance and adapted to supply a centrifugal pump connected to the injection system of the engine, and that the balance pointer is adapted, during its movement, to control the generation of signals controlling on the one hand the filling of the vessel and on the other hand, during a substantially uniform motion of the balance mechanism, the counting of the r.p.m. of the engine and also the time required for consuming a predetermined quantity of fuel, an auxiliary device supplying fuel to the engine and holding the balance against motion during the pause between successive measurements.

According to another feature characterising this invention the balance dial carries electromagnetic double-coiled pick-ups adapted to create a magnetic field intersected by a metal plate secured to the balance pointer in a plane at right angles thereto. Two of these pick-ups disposed the one at position zero and the other at the upper end of the pointer scale control respectively the opening and closing of the electromagnetic valve through which the measuring vessel is filled, another pair of pick-ups disposed intermediate said first-named pick-ups delimiting on said dial a given fuel weight and controlling the beginning and the end of the counts. The use of a centrifugal pump for feeding the engine affords a regular fuel output. This pump is substituted for the conventional piston feed pump incorporated in the injection pump and hitherto used in measuring arrangements. The use of a centrifugal pump permits a regular, shock-free movement of the balance pointer, thus increasing the precision of the measurement. The hitherto detrimental output irregularities due for example to the return of fuel used for scavenging the injection pump in the case of a diesel engine are absorbed or integrated by the considerable kinetic energy of the automatic balance. In fact, the provision of pick-ups on the balance dial permits measuring the fuel consumption when the angular speed of the balance pointer has become stabilized and the pointer travels with a substantially uniform motion during the fuel consumption measurement.

Other features and advantages of this invention will appear more clearly as the following description proceeds with reference to the accompanying drawings illustrating diagrammatically by way of example a typical form of embodiment thereof. In the drawings:

FIGURE 2 is a diagram showing the passage of the balance pointer past a pick-up;

FIGURE 3 shows diagrammatically the float of the measuring reservoir with the "direct" operation pick-ups;

FIGURE 4 is a diagrammatic plane view of the measuring reservoir;

FIGURE 5 is a side elevational and part-sectional view of the measuring reservoir with the pipe lines leading thereto.

Figure 1:
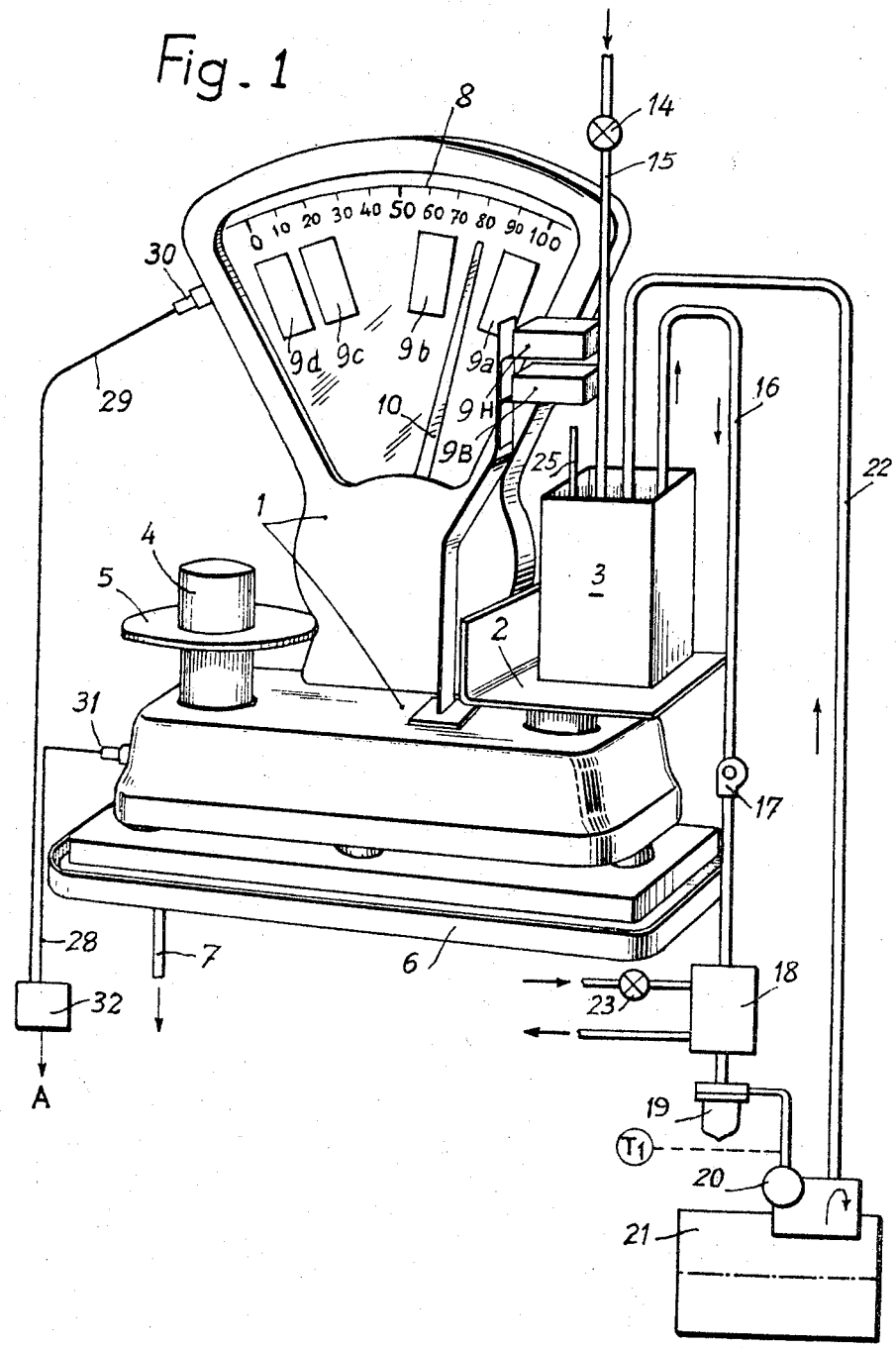
FIGURE 1 is a diagrammatic illustration of the complete measuring apparatus.

Referring first to FIGURE 1, it will be seen that the apparatus according to this invention for measuring the fuel consumption of a diesel engine comprises an automatic self-indicating scale 1 carrying on its pan 2 a measuring vessel or reservoir 3 of square cross-sectional configuration. This scale is supported by a flanged shallow tray 6 having its bottom connected to a drain pipe 7 for discharging any fuel poured accidentally thereon. The permissible measuring range of the scale is consistent with the type and cylinder capacity of the engine to be tested.

Four electromagnetic pick-ups 9a, 9b, 9c and 9d are disposed on the dial 8 of the scale; these pick-ups are of the two-coil type and adapted to create a magnetic flux. The first pick-up 9a is located at the upper end of the scale past which the scale pointer 10 is movable, the last pick-up 9d registering with the zero position of the scale; the third pick-up 9c is disposed as near as possible to pick-up 9d and pick-up 9b is spaced from pick-up 9c by a scale or weight range corresponding to the predetermined weight of the fuel contained in the measuring reservoir, for example 100 grams. The pointer 10 carries a metal plate 11 (see FIGURE 2) which, by passing between the coils 12 and 13 of the pick-up, causes the flux produced thereby to vary and therefore the pick-up to emit a signal.

The signal emitted by pick-up 9a controls the energization and therefore the closing of the electromagnetic fuel filling valve 14 connected by a pipe line 15 to the vessel 3; the opening of this valve 14 is controlled by pick-up 9d. The pick-up 9b controls the beginning of the measuring operation and pick-up 9c the end of this operation.

The electromagnetic valve 14 connects the measuring vessel 3 to a supply or reservoir of fuel, such as gas oil. A centrifugal pump 17 draws fuel from the measuring vessel via a pipe line 16 and forces same through a heat transfer device 18 cooled by mains water, then through a filter 19 to the injection pump 20 of engine 21. Another pipe line 22 directs to the measuring vessel the fuel utilized for scavenging the engine fuel injection system for cooling same.

As the scavenging output is definitely greater than that of the fuel actually consumed by the engine, the fuel throughput in the heat-transfer device 18 may be considered as being constant irrespective of the engine load. Therefore, the cooling water output may be kept to a constant value throughout the test time by properly adjusting the valve 23 so as to maintain a constant fuel temperature of about 14° to 15° C. at the inlet of the fuel injection pump 20.

As shown in FIGURE 3 the measuring vessel 3 contains a float 24 provided with an upstanding metal rod 25. This float controls by means of a pair of electromagnetic pick-ups $9_B$ and $9_H$ the opening and closing of the electromagnetic valve 14 in case of "direct" engine operation during the pause between successive measurements.

In order to compensate the influence exerted by the difference in the Archimedean buoyancy which results from the suction, the measurement is effected under constant-level conditions. The square-sectioned vessel 3 has one side $a$ calculated in cm. by applying the following formula:

$$a = \sqrt{\frac{100}{\delta \cdot h}}$$

wherein $\delta$ is the fuel density and $h$ the vertical travel or lift in cm. of the balance pan. Thus, the height of the measuring fuel is equal to the vertical movement or stroke of the pan.

To avoid recycling the air contained in the scavenging fuel returned to the vessel 3, the pipes are disposed as shown in FIGURES 4 and 5, the suction pipe being immersed under the measuring level 26, the scavenging return pipe 22 opening above the fuel level. To avoid on the other hand any splashing of liquid when opening the filling system the outlet opening of the filling pipe 15 is disposed about 10 mm. above the measuring level. The outlet end of this pipe 15 is substantially T-shaped with one branch sealed at 27 in order to obtain a flat cut of the output.

Electric conductors 28 and 29 lead from outlets 30 and 31 mounted on the scale to a connecting box 32 leading in turn to a control board or cabinet A. These conductors supply 24-v. energizing direct current to the pick-ups and electromagnetic valve and connect same to the control instruments of said cabinet according to the arrangement illustrated in the wiring diagram of FIGURE 6.

Figure 6:
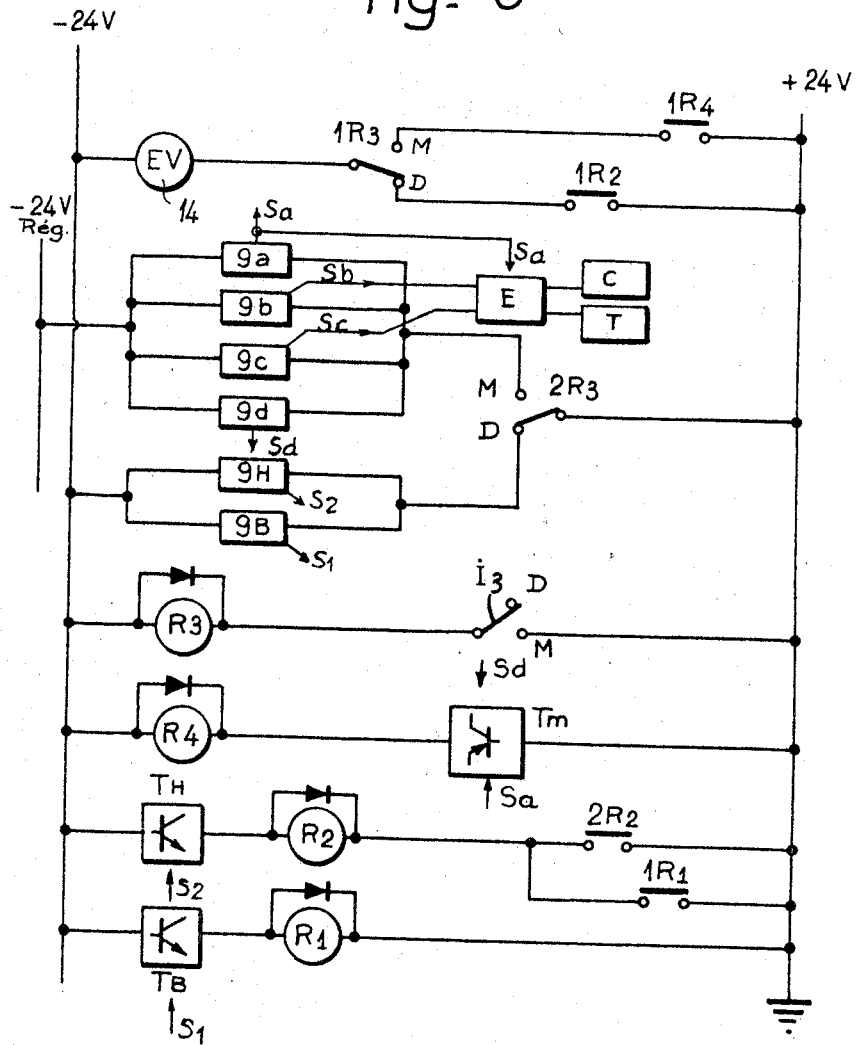
FIGURE 6 is a wiring diagram of the main electrical connections of the appparatus.

This apparatus operates as follows:

In all cases where fuel consumption measurements are not carried out (running-in, warming-up the engine, other tests), care will be taken not to operate the scale uselessly, by moving the program reversing switch $I_3$ of the diagram of FIGURE 6, provided on the control board, to position D as shown in the drawing, which is the "direct" operation position. In this position the electromagnetic valve 14 is controlled by pick-ups $9_H$ and $9_B$. The float 24 is in its low-level position and therefore its rod 25 will cause a signal $S_1$ to be emitted by the lower pick-up $9_B$. This signal will bias a transistor $T_B$ to make it conductive and thus permit the energization of a relay $R_1$ which, via its front contact $1R_1$, closes the energizing circuit of another relay $R_2$. Thus, this relay $R_2$ actuates a front contact $1R_2$ closing in turn the energizing circuit of electromagnetic valve 14 and also a holding contact $2R_2$. When the float rod 25 engages the upper pick-up $9_H$ a signal $S_2$ is emitted thereby to control via transistor $T_H$ the opening of the energizing circuit of relay $R_2$.

The opening of contact $1R_2$ of this relay will thus open the energizing circuit of electromagnetic valve 14 and the filling operation is discontinued.

When the float is lowered the reverse sequence of steps take place: transistor $T_B$ opens the circuit of relay $R_1$ and transistor $T_H$ becomes conductive, to prepare the next cycle.

Throughout the "direct" operation the vessel 3 is filled in order to overload the scale pan 2 and therefore keep the balance in its abutment position; the counters controlled by the dial pick-ups display a zero count.

To switch to the "measure" position the reversing switch $I_3$ is set to its "M" position in order to close the circuit of relay $R_3$ and reverse the contacts $1R_3$ and $2R_3$, whereby a front contact $1R_4$ is inserted into the circuit of electromagnetic valve 14 and the 24-volt D.C. circuit supplying the coils of pick-ups 9a to 9d is closed.

When the engine has consumed some amount of fuel, the pointer 10 of scale 1 will move past the pick-up 9a and register with pick-up 9b.

This pick-up 9b will then emit a signal $S_b$ controlling an electronic device E (not shown in detail in the drawings) controlling in turn a counter-device C, the decade electron count of the engine revolutions and a timer T counting the time during which the predetermined quantity (100 grams) of fuel has been consumed; then the fuel is at level 26 in the measuring vessel 3. During the passage from pick-up 9a to pick-up 9b the scale speed will become stabilized and the pointer will continue to move with a uniform motion. Its passage in front of pick-up 9c which emits a signal $S_c$ transmitted to the electronic control device E, will stop the counts, as the predetermined quantity of fuel (100 grams) has been consumed. The vessel 3 continues to become empty and the scale pointer subsequently registers with zero, thus causing a signal $S_d$ to be emitted by pick-up 9d.

This signal is transmitted to a transistorized device $Tm$ causing a transistor in the control circuit of relay $R_4$ to become conductive; the contact $1R_4$ of this relay is then closed and the electromagnetic valve 14 is open, thus causing the vessel 3 to be filled again.

When the scale pointer has attained the last pick-up 9a the signal $S_a$ emitted thereby will block the transistor in the device $Tm$ and so open the circuit energizing the relay $R_4$ and therefore the contact $1R_4$ thereof; thus, the electromagnetic valve is reclosed. At the same time the signal $S_a$ emitted from pick-up 9a resets the counters C and the timer T and the measuring cycle is resumed.

The various electronic control devices $T_A$, $T_B$, $Tm$ and the electronic counters C and timer T are assembled in the form of a drawer having on its front face means for the digital reading of the engine revolutions and the time required for consuming a quantity or mass of fuel. This drawer may be inserted in a measuring cabinet also comprising instruments for measuring the torque, speed and power output of the engine by means of a dynamometric transmission torquemeter for example as described in a prior French Patent No. 1,509,098 filed by the same applicant on Nov. 29, 1966, and granted on Dec. 4, 1967.

The fuel consumption measurement is automatic and permanent; the values displayed by the electronic counters are to be taken into account only when the various operating conditions (stable temperature measured at the injection pump, engine speed, etc.) have become stable, as a rule after the third cycle of measurements.

The apparatus is adapted to measure fuel masses of 5 grams to 5 kg., whereby the fuel consumption of diesel engines having a cylinder capacity of 800 cc. to 30 litres and more can be measured with a precision of the order of ±0.3%.

The data displayed by the reading instrument of the apparatus may be fed directly to the buffer memory of an ordinator before they are actually treated by this ordinator; thus, the specific fuel consumption can be obtained directly, and if desired a diagram of the characteristic curves of the engine can be recorded by using the same process.

Of course, it would not constitute a departure from the scope of this invention to substitute equivalent members, devices and elements for those shown and described herein by way of example, and on the other hand many modifications and variations may be brought to this specific form of embodiment without departing from the spirit and scope of the invention as set forth in the appended claims.

I claim:

1. An apparatus for measuring with precision the specific fuel consumption of internal combustion engines, notably diesel engines, comprising, in combination, an automatic self-indicating scale with a pointer able to move with uniform speed, a measuring vessel carried on a pan of the scale, an electrically controlled valve for filling said vessel, a centrifugal pump in a tube connecting said vessel to the engine fuel feed injector, counting means for counting engine revolutions and a timer, a plurality of electromagnetic pick-ups of a two-coil type disposed on the scale dial to cooperate with said pointer and emit instantaneous signals which signals control, during measurements, respectively the opening and closing of said electromagnetic valve feeding said vessel, and the beginning and the ending of the counts by said counting means and starting and stopping of said timer during the consumption of a predetermined weight of fuel by the engine, an auxiliary device in the vessel permitting feeding of the engine and holding the scale against motion during pauses between successive measurements.

2. An apparatus according to claim 1 wherein said measuring vessel has preferably a square cross-sectional configuration and its side is equal to $$\sqrt{\frac{Q}{\delta h}}$$

wherein Q is the predetermined quantity of fuel to be measured, $\delta$ the fuel density and $h$ the height of the upward movement of the scale pan in cm.

3. An apparatus according to claim 1, wherein the two endmost electromagnetic pick-ups are in register, one with the zero of said scale dial and the other with the endmost permissible stroke of said scale pointer to control the opening and closing of said valve and the electromagnetic pick-ups controlling the counting means limiting a predetermined fuel weight are intermediate said endmost electromagnetic pick-ups.

4. An apparatus according to claim 3, wherein the electromagnetic pick-up controlling the end of the counting is located as near as possible to the electromagnetic pick-up controlling the opening of said valve.

5. An apparatus according to claim 3 further comprising a transistor device, successively controlling the conduction and cut off of transistor means inserted in circuit means controlling the vessel-feeding electromagnetic valve, responsively connected to said endmost electromagnetic pick-ups on the scale.

6. An apparatus according to claim 3 further comprising an electronic device connected to the intermediate electromagnetic pick-ups to receive their signals, and to said counters and timer to control in succession the beginning and the end of the counts.

7. An apparatus according to claim 6 wherein said electronic device is connected to said endmost electromagnetic pick-up corresponding to the end of the permissible stroke of the scale pointer to receive and transmit the signal of said electromagnetic pick-up for resetting the counters.

8. An apparatus according to claim 1, wherein said auxiliary device in said measuring vessel comprises a float provided with a metal rod cooperating with two electromagnetic pick-ups superposed vertically spaced and adapted to cause a signal to be emitted in succession by said electromagnetic pick-ups for controlling said electromagnetic valve to fill said measuring vessel during the pause between succesesive measurements in order to overload the scale and keep it in its abutment position.

9. An apparatus according to claim 8, further comprising a transistor device inserted in each of two energizing relay circuits controlling the operation of said feeding valve, said transistor devices being controlled respectively by the signals emitted from said electromagnetic pick-ups actuated by the float in said vessel.

References Cited

UNITED STATES PATENTS

| 2,327,419 | 8/1943 | Grandy | 73—113 |
| 2,741,914 | 4/1956 | Irion | 73—113 |
| 2,885,126 | 5/1959 | Hudson | 222—333 |
| 3,091,301 | 5/1963 | Stone | 177—64 |
| 3,179,193 | 4/1965 | Lindeman et al. | 73—113 |

JAMES J. GILL, *Primary Examiner.*

HERBERT GOLDSTEIN, *Assistant Examiner.*

U.S. Cl. X.R.

177—63